US007018454B2

(12) United States Patent
Wood et al.

(10) Patent No.: US 7,018,454 B2

(45) Date of Patent: Mar. 28, 2006

(54) INK JET INK AND RECORDING MATERIAL

(75) Inventors: Mervin G. Wood, Mobile, AL (US); Joseph Suhadolnik, Yorktown Heights, NY (US); Paul Kondracki, Mobile, AL (US)

(73) Assignee: Ciba Specialty Chemicals Corporation, Tarrytown, NY (US)

(*) Notice: Subject to any disclaimer, the term of this patent is extended or adjusted under 35 U.S.C. 154(b) by 0 days.

(21) Appl. No.: 10/735,319

(22) Filed: Dec. 12, 2003

(65) Prior Publication Data

US 2004/0126510 A1 Jul. 1, 2004

Related U.S. Application Data

(60) Provisional application No. 60/434,942, filed on Dec. 20, 2002.

(51) Int. Cl.
*C09D 11/02* (2006.01)
*B32B 3/00* (2006.01)

(52) U.S. Cl. .............................. 106/31.43; 106/31.75; 428/32.1

(58) Field of Classification Search ............ 106/31.43, 106/31.75; 428/32.1
See application file for complete search history.

(56) References Cited

U.S. PATENT DOCUMENTS 4,465,800 A 8/1984 Bhatia ........................ 524/236
5,607,987 A * 3/1997 Winter et al. ................. 524/91
6,102,997 A 8/2000 Helling et al. ........... 106/31.43
6,254,724 B1 7/2001 Seltzer et al. ................. 162/70
6,465,645 B1 * 10/2002 Wood et al. ................ 544/198
6,599,326 B1 7/2003 Seltzer et al. .................. 8/101
6,676,735 B1 * 1/2004 Oki et al. ................ 106/31.46
6,755,875 B1 * 6/2004 Wood et al. .................. 44/275
6,811,597 B1 * 11/2004 Oki et al. ................ 106/31.46
6,875,870 B1 * 4/2005 Wood et al. ................ 546/244
2002/0050226 A1 5/2002 Oki et al. ................ 106/31.46
2002/0088574 A1 7/2002 Seltzer et al. ................. 162/72
2002/0174964 A1 11/2002 Seltzer et al. ............... 162/158
2003/0070582 A1 * 4/2003 Kitamura et al. ........ 106/31.46
2003/0097959 A1 5/2003 Omatsu et al. .......... 106/31.43
2004/0011249 A1 * 1/2004 Oki et al. ................ 106/31.46
2004/0074417 A1 * 4/2004 Biry ........................ 106/31.01
2004/0170779 A1 * 9/2004 Wood et al. ............... 428/32.1
2004/0210056 A1 * 10/2004 Wood et al. ................ 546/216

FOREIGN PATENT DOCUMENTS

JP 05239389 9/1993
JP 11170686 6/1999
JP 11348418 12/1999
JP 2000044851 2/2000
JP 2000062310 2/2000
WO 02/055618 7/2002

OTHER PUBLICATIONS

Patent Abstracts of Japan Publication No. 05239389, Sep. 1993.
English language abstract for JP 2000044851, Feb. 2000.
English language abstract for JP 2000062310, Feb. 2000.

* cited by examiner

*Primary Examiner*—Helene Klemanski
(74) *Attorney, Agent, or Firm*—Tyler A. Stevenson

(57) ABSTRACT

The present invention relates to an ink jet ink, an ink jet recording material or an ink jet system comprising at least one sterically hindered N-hydroxylamine strong acid salt, for example 1-hydroxy-2,2,6,6-tetramethyl-4-hydroxypiperidinium chloride or bis(1-hydroxy-2,2,6,6-tetramethylpiperidin-4-yl)sebacate dihydrochloride; or comprising at least one dialkyl N-hydroxylamine salt, for example chloride, bisulfate, sulfate, phosphate, nitrate, ascorbate, formate, acetate, benzoate, oxalate, citrate, a carboxylate of ethylenediaminetetraacetic acid or of diethylenetriaminepentaacetic acid or polyacrylate salts of N,N-diethylhydroxylamine, N,N-bis(2-hydroxypropyl)hydroxylamine, N,N-bis(3-hydroxypropyl)hydroxylamine, N,N-dibenzylhydroxylamine or the N,N-di(alkyl)hydroxylamine produced by the direct oxidation of N,N-di(hydrogenated tallow)amine.

23 Claims, No Drawings

INK JET INK AND RECORDING MATERIAL

This application claims the benefit under 35 USC 119(e) of U.S. Provisional Application Ser. No. 60/434,942, filed Dec. 20, 2002.

The present invention relates to an ink jet ink, an ink jet recording material or an ink jet system with improved properties.

In the ink jet process, an image is produced by ejecting ink droplets onto a recording material through a nozzle. The ink is in most cases an aqueous solution of a dye. The recording material should rapidly and permanently fix the said dye. Specially prepared papers or plastic films provided with a dye-binding layer are mostly used for this purpose. Owing to the fineness of the nozzles, dyes which are completely dissolved in the ink vehicle are preferred to pigments. Besides, dyes offer a higher chroma and a better color gamut when compared to pigments. However, ink jet dyes usually have a poorer fastness to light than, for example, the colored pigments customary in conventional printing inks. As a result, images produced by ink jet printing usually have a limited lifetime when subjected to light and thus rapidly begin to fade or discolor.

The use of water insoluble hindered amine compounds in ink jet ink or media has been reported in e.g. JP2000062310, JP05239389 and JP11348418.

JP2000044851 teaches an ink composition that contains certain hindered amine compounds.

U.S. Pat. No. 6,102,997 describes an ink jet system that comprises certain amine compounds.

JP99170686 teaches hindered amine type additives generically in the ink receiving layer of ink jet recording media.

U.S. app. No. 20020050226 discloses aqueous ink compositions comprising hindered amine derivatives.

WO02/055618 teaches ink jet inks or ink jet recording materials that comprise hydroxylamine salt compounds.

Sterically hindered N-hydroxylamine salts are disclosed in U.S. Pat. No. 6,254,724.

Dialkyl N-hydroxylamine salts are disclosed in U.S. application Ser. No. 09/177,016, filed Oct. 22, 1998.

It has now been found that certain sterically hindered N-hydroxylamine salts and certain dialkyl N-hydroxylamine salts provide ink jet prints with outstanding permanence. The N-hydroxylamine salts provide outstanding light stability, gas fade stability and dark storage stability.

Gas fade stability refers to stability against exposure to ozone, singlet oxygen and other airborne pollutants such as NOX, SOX, etc.

The present invention therefore relates to an ink jet ink or ink jet recording material comprising at least one sterically hindered N-hydroxylamine strong acid salt of the formula

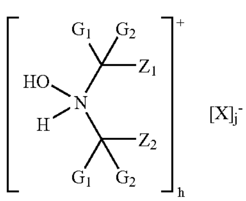

wherein $G_1$ and $G_2$ are independently alkyl of 1 to 4 carbon atoms or are together pentamethylene;

$Z_1$ and $Z_2$ are each methyl, or $Z_1$ and $Z_2$ together form an unsubstituted linking moiety or a linking moiety substituted by one or more groups selected from an ester, ether, hydroxy, oxo, cyanohydrin, amide, amino, carboxy or an urethane group, X is an anion of a strong acid, wherein the total charge of cations h is equal to the total charge of anions j, and wherein the strong acid has a pKa<about 4, or comprising at least one dialkyl N-hydroxylamine salt of the formula $(R_{51}R_{52}N—OH).(HY)$, where $R_{51}$ is alkyl of 1 to 36 carbon atoms, cycloalkyl of 5 to 12 carbon atoms or aralkyl of 7 to 9 carbon atoms; or $R_{51}$ is said alkyl, cycloalkyl or aralkyl substituted by one to six alkyl of 1 to 12 carbon atoms, halogen, cyano, $E_{41}O—$, $E_{41}CO—$, $E_{41}OCO—$, $E_{41}COO—$, $E_{41}S—$, $E_{41}SO—$, $E_{41}SO_2—$, $—NH_2$, $—NHE_{41}$, $—NE_{41}E_{42}$, $—PO(OE_{41})(OE_{42})$ or $—OPO(OE_{41})(OE_{42})$ groups;

$R_{52}$ is hydrogen or independently has the same meaning as $R_{51}$, where at least one of $R_{51}$ and $R_{52}$ contains a hydrogen alpha to the —NOH moiety; or $R_{51}$ and $R_{52}$ together form a $C_{2-12}$heterocyclic ring which contains at least one carbon substituted hydrogen alpha to the —NOH moiety, where said $C_{2-22}$heterocyclic ring is unsubstituted or is substituted by one to three three alkyl of 1 to 12 carbon atoms, halogen, cyano, $E_{41}O—$, $E_{41}CO—$, $E_{41}OCO—$, $E_{41}COO—$, $E_{41}S—$, $E_{41}SO—$, $E_{41}SO_2—$, $—NH_2$, $—NHE_{41}$, $—NE_{41}E_{42}$, $—PO(OE_{41})(OE_{42})$ or $—OPO(OE_{41})(OE_{42})$ groups; or where said $C_{2-12}$heterocyclic ring is interrupted by one to three —O—, $—NE_{41}—$, —CO—, $—CONE_{41}—$, —S—, —SO—, $—SO_2—$, —COO—, $—PO_3—$ or $—PO_4E_{41}$ groups; or where said heterocyclic ring is both substituted and interrupted by said groups;

$E_{41}$ and $E_{42}$ independently are hydrogen, alkyl of 1 to 4 carbon atoms or alkyl of 1 to 4 carbon atoms substituted by one to three hydroxyl groups; or $E_{41}$ and $E_{42}$ independently are an oligomer of poly(ethylene glycol) or poly(propylene glycol) terminated by hydroxyl, methoxy, acetate or propionate, where the oligomer has a molecular weight up to about 500; and HY is an inorganic or organic acid.

Strong acids according to this invention are those with a pKa<about 4, for example mineral acids such as HCl and HBr, sulfuric acid, methanesulfonic acid and phosphoric acid.

Preferably, Y is phosphate, phosphonate, carbonate, bicarbonate, nitrate, chloride, bromide, bisulfite, sulfite, bisulfate, sulfate, borate, formate, acetate, benzoate, citrate, oxalate, tartrate, acrylate, polyacrylate, fumarate, maleate, itaconate, glycolate, gluconate, malate, mandelate, tiglate, ascorbate, polymethacrylate, a carboxylate of nitrilotriacetic acid, hydroxyethylethylenediaminetriacetic acid, ethylenediaminetetraacetic acid or of diethylenetriaminepentaacetic acid, a diethylenediaminetetraacetic acid or of diethylenetriaminepentaacetic acid, an alkylsulfonate or an arylsulfonate.

For example, Y is chloride, bisulfate, sulfate, phosphate, nitrate, ascorbate, formate, acetate, benzoate, oxalate, citrate, a carboxylate of ethylenediaminetetraacetic acid or of diethylenetriaminepentaacetic acid or polyacrylate, for instance Y is chloride, bisulfate or citrate.

The values h and j are for example 1, 2, 3, 4 or 5.

For example, $Z_1$ and $Z_2$ together are a hydrocarbon linking moiety containing 1–200, especially 1–60 carbon atoms and 0–60, especially 0–30 heteroatoms selected from oxygen atoms and nitrogen atoms.

For instance, $Z_1$ and $Z_2$ as a linking moiety are a chain of 2 or 3 carbon atoms or 1 or 2 carbon atoms and a nitrogen or oxygen atom forming together with the remaining structure a saturated unsubstituted 5- or 6-membered heterocyclic ring or a 5- or 6-membered heterocyclic ring substituted by one or more groups selected from an ester, ether, hydroxy, oxo, cyanohydrin, amide, amino, carboxy or an urethane group. The substituents in $Z_1$ and $Z_2$ themselves may contain hindered amine moieties.

For the purposes of this invention, the terms "ink jet recording material" is synonymous with "ink jet recording media" and refers to the entire composition which receives the ink jet ink, or likewise also refers to any individual layers or combinations of individual layers of the entire recording material composition.

Furthermore, the invention relates to an ink jet system, comprising a recording material and at least one colored ink to be applied to the recording material by means of an ink jet nozzle, characterized in that at least either the recording material or at least one colored ink comprises at least one hydroxylamine salt compound as defined above.

Furthermore, the invention relates to a process for stabilizing ink jet prints which comprises applying to a recording material for ink jet printing an ink composition comprising an aqueous or an organic solvent dye solution and at least one present hydroxylamine salt compound as defined above and drying said recording material.

In another embodiment the process for stabilizing ink jet prints comprises applying to a recording material for ink jet printing a casting or coating dispersion or an aqueous or organic solution comprising at least one hydroxylamine salt compound as defined above and further applying either an ink composition comprising an aqueous or an organic solvent dye solution; or an ink composition comprising an aqueous or an an organic solvent dye solution and at least one hydroxylamine salt compound and drying said recording material.

Examples of especially suited sterically hindered N-hydroxylamine salt compounds are those of the formula (A*)

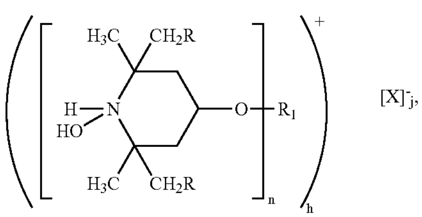

(B*)

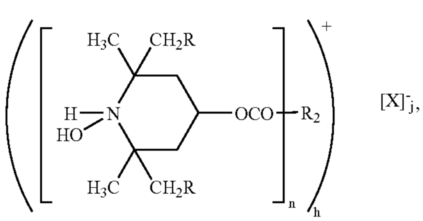

-continued (C*)

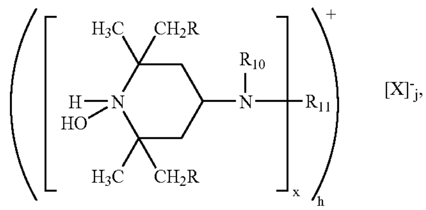

(D*)

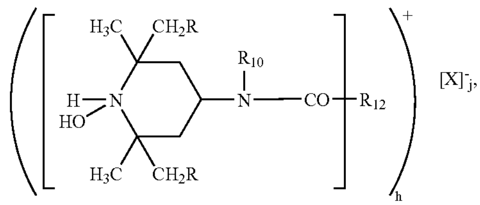

(H*)

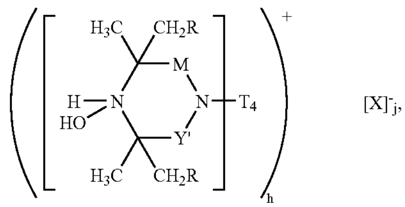

(I*)

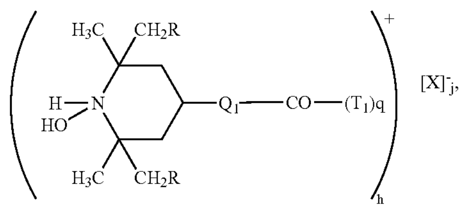

(J*)

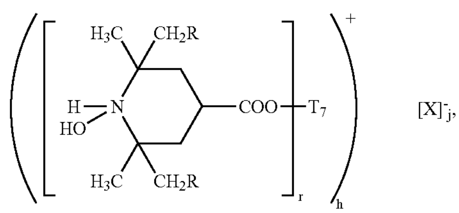

(K*)

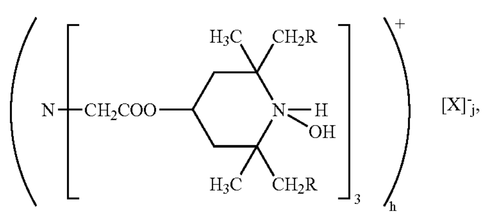

(S*)

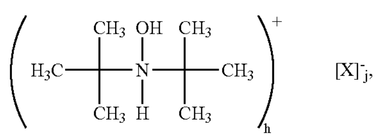

(X*)

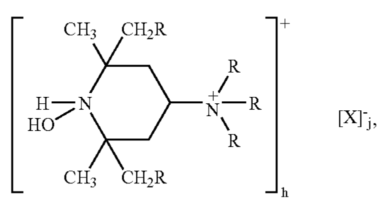

-continued (Y*)

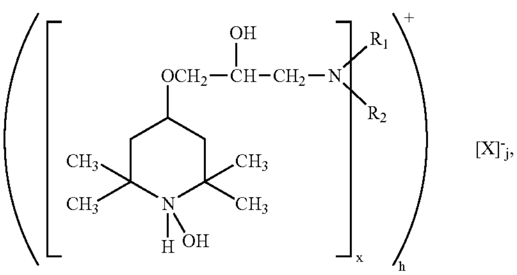

(Z*)

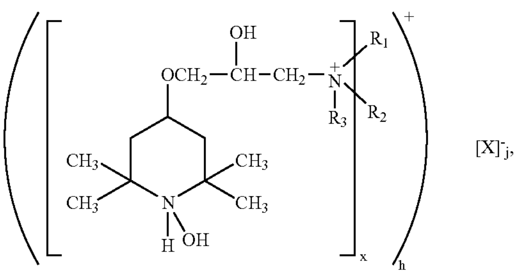

(AA*)

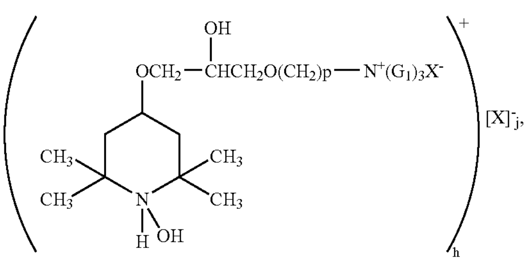

(BB*)

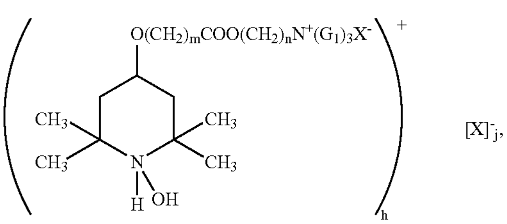

(CC*)

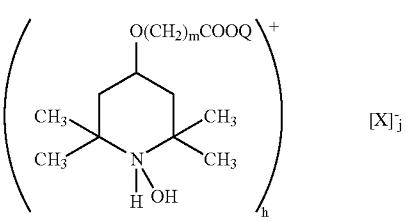

and (DD*)

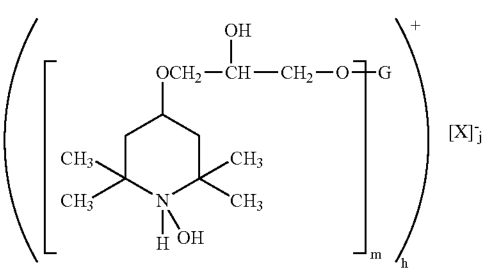

wherein

R is hydrogen or methyl;

and in formula A*, n is 1 or 2, and when n is 1, $R_1$ is hydrogen, alkyl of 1 to 18 carbon atoms, alkenyl of 2 to 18 carbon atoms, propargyl, glycidyl, alkyl of 2 to 50 carbon atoms interrupted by one to twenty oxygen atoms, said alkyl substituted by one to ten hydroxyl groups or both interrupted by said oxygen atoms and substituted by said hydroxyl groups, or $R_1$ is alkyl of 1 to 4 carbon atoms substituted by a carboxy group or by —COOZ where Z is hydrogen, alkyl of 1 to 4 carbon atoms or phenyl, or where Z is said alkyl substituted by $—(COO^-)_n M^{n+}$ where n is 1–3 and M is a metal ion from the 1st, 2nd or 3rd group of the periodic table or is Zn, Cu, Ni or Co, or M is a group $N^{n+}(R_2)_4$ where $R_2$ is alkyl of 1 to 8 carbon atoms or benzyl, when n is 2, $R_1$ is alkylene of 1 to 12 carbon atoms, alkenylene of 4 to 12 carbon atoms, xylylene or alkylene of 1 to 50 carbon atoms interrupted by one to twenty oxygen atoms, substituted by one to ten hydroxyl groups or both interrupted by said oxygen atoms and substituted by said hydroxyl groups;

in formula B*, m is 1 to 4, and when m is 1, $R_2$ is alkyl of 1 to 18 carbon atoms, alkyl of 3 to 18 carbon atoms interrupted by —COO—, alkyl of 3 to 18 carbon atoms substituted by COOH or COO—, or $R_2$ is $—CH_2(OCH_2CH_2)_nOCH_3$ where n is 1 to 12, or $R_2$ is cycloalkyl of 5 to 12 carbon atoms, aryl of 6 to 12 carbon atoms, or said aryl substituted by one to four alkyl groups of 1 to 4 carbon atoms, or $R_2$ is $—NHR_3$ where $R_3$ is alkyl of 1 to 18 carbon atoms, cycloalkyl of 5 to 12 carbon atoms, aryl of 6 to 12 carbon atoms, or said aryl substituted by one to four alkyl of 1 to 4 carbon atoms, or $R_2$ is $—N(R_3)_2$ where $R_3$ is as defined above, when m is 2, $R_2$ is alkylene of 1 to 12 carbon atoms, alkenylene of 4 to 12 carbon atoms, xylylene, alkylene of 2 to 12 carbon atoms interrupted by —COO—, alkylene of 3 to 18 carbon atoms substituted by COOH or COO—, or $R_2$ is $—CH_2(OCH_2CH_2)_nOCH_2—$ where n is 1 to 12, or $R_2$ is cycloalkylene of 5 to 12 carbon atoms, aralkylene of 7 to 15 carbon atoms or arylene of 6 to 12 carbon atoms, or $R_2$ is $—NHR_4NH—$ where $R_4$ is alkylene of 2 to 18 carbon atoms, cycloalkylene of 5 to 12 carbon atoms, aralkylene of 8 to 15 carbon atoms or arylene of 6 to 12 carbon atoms, or $R_2$ is $—N(R_3)R_4N(R_3)—$ where $R_3$ and $R_4$ are as defined above, or $R_2$ is —CO— or —NH—CO—NH—, when m is 3, $R_2$ is alkanetriyl of 3 to 8 carbon atoms or benzenetriyl, or when m is 4, $R_2$ is alkanetetrayl of 5 to 8 carbon atoms or benzenetetrayl, in formula C*, $R_{10}$ is hydrogen, alkyl of 1 to 18 carbon atoms, cycloalkyl of 5 to 12 carbon atoms, aralkyl of 7 to 15 carbon atoms, alkanoyl of 2 to 18 carbon atoms, alkenoyl of 3 to 5 carbon atoms or benzoyl, x is 1 or 2, and when x is 1, $R_{11}$ is hydrogen, alkyl of 1 to 18 carbon atoms, alkenyl of 2 to 18 carbon atoms, propargyl, glycidyl, alkyl of 2 to 50 carbon atoms interrupted by one to twenty oxygen atoms, said alkyl substituted by one to ten hydroxyl groups or both interrupted by said oxygen atoms and substituted by said hydroxyl groups, or $R_{11}$ is alkyl of 1 to 4 carbon atoms substituted by a carboxy group or by —COOZ where Z is hydrogen, alkyl of 1 to 4 carbon atoms or phenyl, or where Z is said alkyl substituted by $—(COO^-)_nM^{n+}$ where n is 1–3 and M is a metal ion from the 1st, 2nd or 3rd group of the periodic table or is Zn, Cu, Ni or Co, or M is a group $N^{n+}(R_2)_4$ where $R_2$ is hydrogen, alkyl of 1 to 8 carbon atoms or benzyl, or when x is 2, $R_{11}$ is alkylene of 1 to 12 carbon atoms, alkenylene of 4 to 12 carbon atoms, xylylene or alkylene of 1 to 50 carbon atoms interrupted by one to twenty oxygen atoms, substituted by one to ten hydroxyl groups or both interrupted by said oxygen atoms and substituted by said hydroxyl groups, in formula D*, y is 1 to 4, $R_{10}$ is as defined above, and $R_{12}$ is defined as $R_2$ above, in formula H*, p is 1 or 2, $T_4$ is as defined for $R_{11}$ when x is 1 or 2, M and Y' are independently methylene or carbonyl, preferably M is methylene and Y' is carbonyl, in formula I*, this formula denotes a recurring structural unit of a polymer where $T_1$ is ethylene or 1,2-propylene or is the repeating structural unit derived from an alpha-olefin copolymer with an alkyl acrylate or methacrylate, and where q is 2 to 100, $Q_1$ is $—N(R_3)—$ or —O— where $R_3$ is as defined above, in formula J*, r is 1 or 2, $T_7$ is as defined for $R_1$ when n is 1 or 2 in formula A*, preferably $T_7$ is octamethylene when r is 2, wherein in formulae X* to CC*, h is 2 or 3, $G_1$ is hydrogen, methyl, ethyl, butyl or benzyl, m is 1 to 4, x is 1 to 4, when x is 1, $R_1$ and $R_2$ are independently alkyl of 1 to 18 carbon atoms, said alkyl interrupted by one to five oxygen atoms, said alkyl substituted by 1 to 5 hydroxyl groups or said alkyl both interrupted by said oxygen atoms and substituted by said hydroxyl groups; cycloalkyl of 5 to 12 carbon atoms, aralkyl of 7 to 15 carbon atoms, aryl of 6 to 10 carbon atoms or said aryl substituted by one to three alkyl of 1 to 8 carbon atoms, or $R_1$ is also hydrogen, or $R_1$ and $R_2$ are together tetramethylene, pentamethylene, hexamethylene or 3-oxapentamethylene, when x is 2, $R_1$ is hydrogen, alkyl of 1 to 8 carbon atoms, said alkyl interrupted by one or two oxygen atoms, said alkyl substituted by a hydroxyl group, or said alkyl both interrupted by one or two oxygen atoms and substituted by a hydroxyl group, $R_2$ is alkylene of 2 to 18 carbon atoms, said alkylene interrupted by one to five oxygen atoms, said alkylene substituted by 1 to 5 hydroxyl groups or said alkylene both interrupted by said oxygen atoms and substituted by said hydroxyl groups; o-, m- or p-phenylene or said phenylene substituted by one or two alkyl of 1 to 4 carbon atoms, or $R_2$ is $—(CH_2)_kO[(CH_2)_kO]_h(CH_2)_k—$ where k is 2 to 4 and h is 1 to 40, or $R_1$ and $R_2$ together with the two N atoms to which they are attached are piperazin-1,4-diyl, when x is 3, $R_1$ is hydrogen, $R_2$ is alkylene of 4 to 8 carbon atoms interrupted by one nitrogen atom, when x is 4, $R_1$ is hydrogen, $R_2$ is alkylene of 6 to 12 carbon atoms interrupted by two nitrogen atoms, $R_3$ is hydrogen, alkyl of 1 to 8 carbon atoms, said alkyl interrupted by one or two oxygen atoms, said alkyl substituted by a hydroxyl group, or both interrupted by one or two oxygen atoms and substituted by a hydroxyl group, p is 2 or 3, and Q is an alkali metal salt, ammonium or $N^+(G_1)_4$, and in formula DD*, m is 2 or 3, when m is 2, G is $—(CH_2CHR—O)_rCH_2CHR—$, where r is 0 to 3, and R is hydrogen or methyl, and when m is 3, G is glyceryl.

The sterically hindered N-hydroxylamine salts are for example those of formulae A*, B*, C*, D*, S*, X*, Y* and Z*, wherein R is hydrogen, in formula A*, n is 1 or 2, when n is 1, $R_1$ is hydrogen, alkyl of 1 to 6 carbon atoms, alkenyl of 2–6 carbon atoms, propargyl, glycidyl, alkyl of 2 to 20 carbon atoms interrupted by one to ten oxygen atoms, said alkyl substituted by one to five hydroxyl groups or both interrupted by said oxygen atoms and substituted by said hydroxyl groups, or $R_1$ is alkyl of 1 to 4 carbon atoms substituted by a carboxy group or by —COOZ where Z is hydrogen or alkyl of 1 to 4 carbon atoms, when n is 2, $R_1$ is alkylene of 1 to 8 carbon atoms, alkenylene of 4 to 8 carbon atoms, alkylene of 1 to 20 carbon atoms interrupted by one to ten oxygen atoms, substituted by one to five hydroxyl groups or both interrupted by said oxygen atoms and substituted by said hydroxyl groups, in formula B*, m is 1 or 2, when m is 1, $R_2$ is alkyl of 1 to 4 carbon atoms or $R_2$ is $CH_2(OCH_2CH_2)_nOCH_3$ where n is 1 to 12, or $R_2$ is phenyl, or said phenyl substituted by one to three methyl groups, or $R_2$ is $—NHR_3$ where $R_3$ is alkyl of 1 to 4 carbon atoms or phenyl, or said phenyl substituted by one or two methyl groups, when m is 2, $R_2$ is alkylene of 1 to 8 carbon atoms, alkenylene of 4 to 8 carbon atoms, or $R_2$ is $—CH_2(OCH_2CH_2)_nOCH_2—$ where n is 1 to 12, or $R_2$ is $NHR_4NH$ where $R_4$ is of 2 to 6 carbon atoms, aralkylene of 8 to 15 carbon atoms or arylene of 6 to 12 carbon atoms, or $R_2$ is —CO— or —NHCONH, in formula C*, $R_{10}$ is hydrogen or, alkanoyl of 1 to 3 carbon atoms, x is 1 or 2, when x is 1, $R_{11}$ is hydrogen, alkyl of 1 to 6 carbon atoms or glycidyl, or $R_{11}$ is alkyl of 1 to 4 carbon atoms substituted by a carboxy group or by COOZ where Z is hydrogen or alkyl of 1 to 4 carbon atoms, when x is 2, $R_{11}$ is alkylene of 1 to 6 carbon atoms, in formula D*, $R_{10}$ is hydrogen,
y is 1 or 2,
$R_{12}$ is defined as $R_2$ above,
in formula Y* and Z*,
x is 1 or 2,
when x is 1,
$R_1$ and $R_2$ are independently alkyl of 1 to 4 carbon atoms or $R_1$ and $R_2$ are together tetramethylene, or pentamethylene, $R_2$ is hydrogen or alkyl of 1 to 4 carbon atoms, said alkyl group substituted by a hydroxyl group,
when x is 2,
$R_1$ is hydrogen, alkyl of 1 to 4 carbon atoms, said alkyl substituted by a hydroxyl group,
$R_2$ is alkylene of 2 to 6 carbon atoms, and
$R_3$ is as defined above.

Especially preferred sterically N-hydroxylamine salts are those of formulae A*, B*, C* and D* wherein
R is hydrogen,
in formula A*,
n is 1,
$R_1$ is hydrogen, alkyl of 1 to 4 carbon atoms, glycidyl, alkyl of 2 to 4 carbon atoms interrupted by one or two oxygen atoms, said alkyl substituted by one or two hydroxyl groups or both interrupted by said oxygen atoms and substituted by said hydroxyl groups, or $R_1$ is alkyl of 1 to 4 carbon atoms substituted by —COOZ where Z is hydrogen or alkyl of 1 to 4 carbon atoms,
in formula B*,
m is 1 or 2,
$R_2$ is alkyl of 1 to 4 carbon atoms or $R_2$ is $CH_2(OCH_2CH_2)_n OCH_3$ where n is 1 to 4,
when m is 2,
$R_2$ is alkylene of 1 to 8 carbon atoms,
in formula C*,
$R_{10}$ is hydrogen or alkanoyl of 1 or 2 carbon atoms,
x is 1 or 2,
when x is 1,
$R_{11}$, is hydrogen, alkyl of 1 to 4 carbon atoms or glycidyl,
$R_{11}$ is alkyl of 1 to 4 carbon atoms substituted by COOZ where Z is hydrogen or alkyl of 1 to 4 carbon atoms,
when x is 2,
$R_{11}$ is alkylene of 1 to 6 carbon atoms,
in formula D*,
$R_{10}$ is hydrogen,
y is 1 or 2,
$R_{12}$ is defined as $R_2$ above.

Present sterically hindered N-hydroxylamine salts which are mineral acid salts are of particular value. For example, compounds of particular value are those of formula B* which are mineral acid salts. Mineral acid salts are hydrochlorides or hydrobromides.

The compounds 1-hydroxy-2,2,6,6-tetramethyl-4-hydroxypiperidinium chloride and bis(1-hydroxy-2,2,6,6-tetramethylpiperidin-4-yl)sebacate dihydrochloride are of particular value.

The present dialkyl N-hydroxylamine salt stabilizers are, for example, salts of N,N-dihydrocarbylhydroxylamines wherein $R_{51}$ and $R_{52}$ are independently benzyl, methyl, ethyl, octyl, lauryl, dodecyl, tetradecyl, hexadecyl, heptadecyl or octadecyl, or wherein $R_{51}$ and $R_{52}$ are each the alkyl mixture found in hydrogenated tallow amine.

The present dialkyl N-hydroxylamine salt stabilizers are, for example, salts of N,N-dihydrocarbylhydroxylamines selected from the group consisting of N,N-dibenzylhydroxylamine, N,N-dimethylhydroxylamine, N,N-diethylhydroxylamine, N,N-bis(2-hydroxypropyl)hydroxylamine, N,N-bis(3-hydroxypropyl)hydroxylamine, N,N-bis(2-carboxyethyl)hydroxylamine, N,N-bis(benzylthiomethyl)hydroxylamine, N,N-dioctylhydroxylamine, N,N-dilaurylhydroxylamine, N,N-didodecylhydroxylamine, N,N-ditetradecylhydroxylamine, N,N-dihexadecylhydroxylamine, N,N-dioctadecylhydroxylamine, N-hexadecyl-N-tetradecylhydroxylamine, N-hexadecyl-N-heptadecylhydroxylamine, N-hexadecyl-N-octadecylhydroxylamine, N-heptadecyl-N-octadecylhydroxylamine, N-methyl-N-octadecylhydroxylamine and N,N-di(hydrogenated tallow)hydroxylamine.

For example, the present dialkyl N-hydroxylamine salt stabilizer are salts of N,N-diethylhydroxylamine, N,N-bis(2-hydroxypropyl)hydroxylamine, N,N-bis(3-hydroxypropyl)-hydroxylamine or N,N-dibenzylhydroxylamine.

The present N,N-dialkyl N-hydroxylamine salt stabilizer is for example salts of N,N-di(alkyl)hydroxylamine produced by the direct oxidation of N,N-di(hydrogenated tallow)amine (Irgastab® FS-042, Ciba Specialty Chemicals Corp.).

For example, the dialkyl N-hydroxylamine salt is tris(N,N-diethylhydroxylammonium)citrate.

Alkyl groups, including alkyl groups of the various substituent groups, are linear or are branched.

Alkyl is for example methyl, ethyl, propyl such as n- or isopropyl, butyl such as n-, iso-, sec- and tert-butyl, pentyl, hexyl, heptyl, octyl, nonyl, decyl, undecyl, dodecyl, tridecyl, tetradecyl, pentadecyl, hexadecyl, heptadecyl or octadecyl.

Aryl is $C_6$–$C_{12}$aryl, for example phenyl or naphthyl.

Alkylene is for example methylene, 1,2-ethylene, 1,1-ethylene, 1,3-propylene, 1,2-propylene, 1,1-propylene, 2,2-propylene, 1,4-butylene, 1,3-butylene, 1,2-butylene, 1,1-butylene, 2,2-butylene, 2,3-butylene, or —$C_5H_{10}$—, —$C_6H_{12}$—, $C_7H_{14}$, —$C_8H_{16}$—, —$C_9H_{18}$—, —$C_{10}H_{20}$—, —$C_{11}H_{22}$—, —$C_{12}H_{24}$—, —$C_{13}$ $H_{26}$—, —$C_{14}H_{28}$—, —$C_{15}H_{30}$—, —$C_{16}H_{32}$—, —$C_{17}H_{34}$— and —$C_{18}H_{36}$—.

Cycloalkyl is for example, cyclopentyl, cyclohexyl, cycloheptyl, cyclooctyl, cyclononyl, cyclodecyl, cycloundecyl or cyclododecyl.

Aralkyl is for example phenylalkyl, which is alkyl substituted by phenyl. Examples are benzyl, α-methylbenzyl, and α-cumyl.

Alkenyl is ethylenically unsaturated alkyl, for example allyl, ethenyl, propenyl, butenyl.

Alkynyl is acetylenically unsaturated alkyl, for example propargyl.

An aliphatic or aromatic moiety, such as mentioned above or other definitions, mainly is an aliphatic or aromatic $C_1$–$C_{30}$hydrocarbon; examples are aryl, alkyl, cycloalkyl, alkenyl, cycloalkenyl, bicycloalkyl, bicycloalkenyl, and combinations of these groups.

Alkanoyl is for example formyl, acetyl, propionyl, butanoyl, pentanoyl, hexanoyl, heptanoyl, octanoyl, nonanoyl, decanoyl, undecanoyl, dodecanoyl, tridecanoyl, tetradecanoyl, pentadecanoyl, hexadecanoyl, heptadecanoyl, octadecanoyl, icosanoyl or docosanoyl.

Alkenoyl is ethylenically unsaturated alkanoyl, for example acryloyl or methacryloyl.

Alkyl groups interrupted by oxygen atoms are for example —$CH_2$—O—$CH_3$, —$CH_2$—$CH_2$—O—$CH_3$, —$CH_2$—$CH_2$—O—$CH_2$—$CH_3$, —$CH_2$—O—$CH_2$—$CH_2$—O—$CH_3$ or —$CH_2$—O—$CH_2$—O—$CH_3$.

Alkyl groups substituted by hydroxy are for example hydroxyethyl, di-hydroxyethyl, hydroxypropyl, di-hydroxypropyl, hydroxybutyl, hydroxypentyl or hydroxyhexyl.

Halogen is for example chloro, fluoro or bromo.

$C_{2-12}$heterocyclic rings are for example 5- or 6-membered rings such as

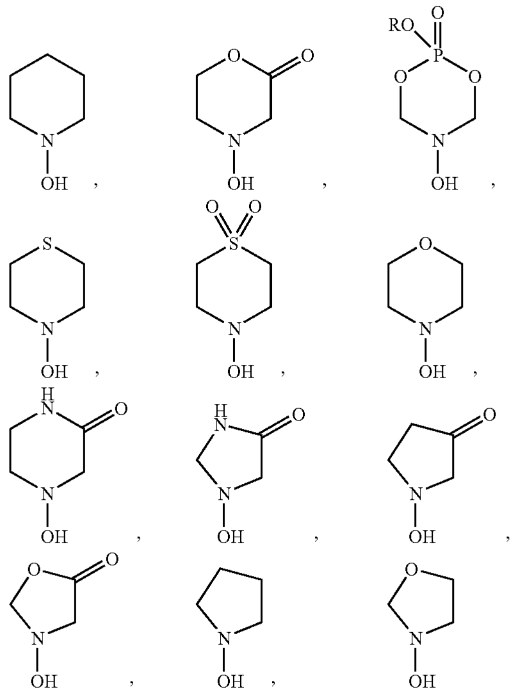

and the like.

The solubility of the present stabilizers in water at 20° C. and standard pressure is for example greater than or equal to 1 g/L, for instance greater than or equal to 10 g/L.

The present compounds can be prepared according to methods known in the art or in analogy to those methods. For example the sterically hindered N-hydroxylamine salt compounds can be prepared by reduction of the corresponding nitroxyl compound. The nitroxyl compound can be prepared by oxidizing the corresponding amine with a hydroperoxide in the presence of a catalyst selected from the group consisting of the metal carbonyls, the metal oxides, the metal acetylacetonates and the metal alkoxides where the metal is selected from groups IVb, Vb, VIb, VIIb and VIII of the periodic table, at a temperature of 0° C. to 200° C. with the mole ratio of hydroperoxide to amine being 50:1 to 1:10 as disclosed in U.S. Pat. No. 4,665,185.

Sterically hindered N-hydroxylamine salts are disclosed in U.S. Pat. No. 6,254,724, the relevent disclosure of which is hereby incorporated by reference.

Hydroxylamine derivatives, such as N,N,-dialkylhydroxylamines and N,N-dibenzylhydroxylamine, are well known as useful stabilizers for a variety of polymeric substrates as is taught for example in U.S. Pat. Nos. 4,590,231, 4,668,721, 4,782,105 and 4,876,300, the relevant parts of which are incorporated herein by reference.

U.S. Pat. Nos. 4,649,221 and 4,703,073 teach the use of polyhydroxylamine compounds and alkylated N,N-dibenzylhydroxylamine derivatives, respectively, towards stabilizing polyolefins. The disclosures of these U.S. Patents are also hereby incorporated by reference.

Ester, amide or thio substituted N,N-dialkylhydroxylamines are described in U.S. Pat. Nos. 4,612,393, 4,720,517 and 5,019,285, the relevant disclosures of which are also hereby incorporated by reference.

The present sterically hindered N-hydroxylamine salts and the dialkyl N-hydroxylamine salts are used either in the ink jet recording material or in at least one ink jet ink or in both.

The ink jet ink according to this invention comprises about 0.01 to to about 30% by weight, for example about 0.1 to about 20% by weight, of at least one present sterically hindered N-hydroxylamine salt or dialkyl N-hydroxylamine salt, based on the weight of the ink jet ink.

The ink jet recording material according to this invention comprises about 1 to about 10000 $mg/m^2$, for example about 50 to about 2000 $mg/m^2$, of at least one present sterically hindered N-hydroxylamine salt or dialkyl N-hydroxylamine salt.

The present sterically hindered N-hydroxylamine salts and the dialkyl N-hydroxylamine salts are preferably added to casting or coating dispersions which are applied by customary techniques to the support of the ink jet recording material; or they can be absorbed onto the material from an aqueous or organic solution. If the recording material contains more than one layer, the compounds according to this invention can be added to one layer or can be distributed over a plurality of layers, wherein they can be applied to a plurality of layers in the same or different concentrations.

The present sterically hindered N-hydroxylamine salts and the dialkyl N-hydroxylamine salts are preferably used in ink jet inks or recording materials, but may also be incorporated in ink compositions for felt-tipped pens, ink pads, fountain pens, and pen plotters, as well as for offset, book, flexographic and intaglio printing, and also for typewriter ribbons for dot matrix and calligraphic printing. The sterically hindered N-hydroxylamine salts and the dialkyl N-hydroxylamine salts can further be used in silver halide photographic materials as well as in recording materials for pressure-sensitive copying systems, microcapsule photocopier systems, heat-sensitive copier systems, dye diffusion transfer printing, thermal wax transfer printing and dot matrix printing, and for use with electrostatic, electrographic, electrophoretic, magnetographic and laser-electrophotographic printers, recorders or plotters.

Amongst the printers used for ink jet printing, a distinction is usually made between continuous and drop-on-demand printers. The ink jet system according to this invention is suited for use with both type of printers.

The ink compositions according to the novel ink jet system are preferably water-borne inks and may contain water soluble solvents such as ethylene glycol, diethylene glycol, triethylene glycol or higher ethylene glycols, propylene glycol, 1,4-butanediol, or ethers of such glycols, thiodiglycol, glycerol and the ethers and esters thereof, polyglycerol, mono-, di- and triethanolamine, propanolamine, dimethyl formamide, dimethyl sulfoxide, dimethyl acetamide, N-methylpyrrolidone, 1,3-dimethylimidazolidone, methanol, ethanol, isopropanol, n-propanol, diacetone alcohol, acetone, methyl ethyl ketone or propylene carbonate.

The ink compositions according to the novel ink jet system preferably contain water soluble dyes, such as those known for dyeing natural fibres. These can, for example, be acid dyes, direct dyes, reactive dyes, mono-, di- or polyazo dyes, triphenylmethane dyes, xanthene dyes or phtalocyanine dyes. Specific examples of such dyes are Food Black 2, Direct Black 19, Direct Black 38, Direct Black 168, Sulphur Black 1, Acid Red 14, Acid Red 35, Acid Red 52, Acid Red 249, Direct Red 227, Reactive Red 24, Reactive Red 40, Reactive Red 120, Reactive Red 159, Reactive Red 180, Acid Yellow 17, Acid Yellow 23, Direct Yellow 86, Direct Yellow 132, Acid blue 9, Acid Blue 185, Direct Blue 86, Direct Blue 199, copper phtalocyanines and the azo dyes listed in EP-A-366 221.

The ink compositions according to the invention may be nonaqueous and consist of a solution of dyes in an organic solvent or a mixture of organic solvents. Examples of solvents used for this purpose are alkyl carbitols, alkylcellosolves, dialkylformamides, dialkylacetamides, alcohols, acetone, methylethylketone, diethylketone, diethyl ketone, methyl isobutyl ketone, diisopropyl ketone, dibutyl ketone, dioxane, ethyl butyrate, ethyl isovalerate, diethyl malonate, diethyl succinate, butyl acetate, triethyl phosphate, ethylglycol acetate, toluene, xylene, tetralin or petroleum fractions. Example of solid waxes as solvents, which, as an ink carrier, must first be heated, are stearic or palmiric acid. Solvent based inks contain dyes soluble therein, for example Solvent Red, Solvent Yellow, Solvent Orange, Solvent Blue, Solvent Green, Solvent Violet, Solvent Brown or Solvent Black.

The ink compositions according to the novel ink jet system may also contain minor amounts of conventional modifiers such as binders, surfactants, biocides, corrosion inhibitors, sequestrants, pH buffers or conductivity additives. They may also contain further light stabilizers or UV absorbers, including the compounds disclosed in U.S. Pat. No. 5,073,448, U.S. Pat. No. 5,089,050, U.S. Pat. No. 5,096,489, U.S. Pat. No. 5,124,723, U.S. Pat. No. 5,098,477 and U.S. Pat. No. 5,509,957.

The ink compositions according to the invention may also consist of more than one phase. Ink compositions that consist of an aqueous phase in which the dye is dissolved and a dispersed oil phase that contains an UV absorber and/or an antioxidant are for example disclosed in JP-A-0 1170 675, JP-A-0 1182 379, JP-A-0 1182 380, JP-A-01182 381, JP-A-0 1193 376. Oil soluble dyes can be dissolved in an oil together with UV absorbers and/or antioxidants. The oil is either emulsified or dispersed in an aqueous phase as described, inter alia, in JP-A-0 1170 674 and JP-A-0 1170 672.

Further suited ink jet ink compositions are described in EP-A-672 538, pages 3 to 6.

The recording materials according to the novel ink jet system consist of a substrate having a surface which is printable by means of an ink jet. The substrate is usually plain paper or polyolefine-laminated paper or a plastic sheet and is usually coated with at least one layer which is able to absorb ink. The substrate preferably has a thickness of 80 to 250 μm.

Uncoated paper might also be used. In this case, the paper acts simultaneously as substrate and ink absorbing layer. Materials made of cellulosic fibres and textile fibres materials such as cotton fabrics or blends of cotton and polyacrylamide or polyester, which might contain the present sterically hindered N-hydroxylamine salts or the dialkyl N-hydroxylamine salts, can also be used as printing materials.

The recording materials may also be transparent, as in the case of overhead projection transparencies.

The present sterically hindered N-hydroxylamine salts and the dialkyl N-hydroxylamine salts can be incorporated in the substrate during production thereof, conveniently by addition to the pulp during paper manufacture. Another method of application consists in spraying the substrate with a solution of the present sterically hindered N-hydroxylamine salts or the dialkyl N-hydroxylamine salts in water or in a readily volatile organic solvent. The use of emulsions or dispersions is also possible.

Usually, however, at least one coating composition with high dye affinity is coated onto the substrate and, in this case, the present sterically hindered N-hydroxylamine salts and the dialkyl N-hydroxylamine salts are added to at least one of the said coating compositions. Typical coating compositions comprise, for example, a solid filler, a binder and conventional additives.

Example of suitable fillers are $SiO_2$, kaolin, talc, clay, calcium silicate, magnesium silicate, aluminium silicate, gypsum, zeolites, bentonite, diatomaceous earth, vermiculite, starch or the surface modified $SiO_2$ described in JP-A-60 260 377. Small amounts of white pigments, for example titanium dioxide, barytes, magnesium oxide, lime, chalk or magnesium carbonate, can be used with the filler in the coating composition, provided they do not significantly lower the print density of the ink jet prints.

Coating compositions which are intended for transparent, projectable recording materials must not contain any light-scattering particles, such as pigments and fillers.

The present hydroxylamine salt compounds may advantageously be employed in a nanoporous or microporous ink jet material.

The binder binds the fillers to one another and to the substrate. Typical conventional binders are water soluble polymers such as polyvinyl alcohol, partially hydrolysed polyvinyl acetate, cellulose and cellulose derivatives such as hydroxyethyl cellulose, polyvinyl pyrrolidone and copolymers thereof, polyethylene oxide, salts of polyacrylic acid, sodium alginate, starch and starch derivatives, Na alginate, polyethylene imine, polyvinylpyridinium halide, gelatines and gelatine derivatives such as phthaloyl gelatines, casein, vegetable gum, dextrin, albumin, dispersions and polyacrylates or acrylate/methacrylate copolymers, lattices of natural or synthetic rubber, poly(meth)acrylamide, polyvinyl ethers, polyvinyl esters, copolymers of maleic acid, melamine resins, urea resins, water soluble polyurethanes and polyesters, or the chemically modified polyvinyl alcohols disclosed in JP-A-61 134 290 or JP-A-61 134 291.

An additional dye receptor or a mordant which enhances the fixation of the dye to the coating may be added to the binder. Dye receptors for acid dyes are cationic or amphoteric. The cationic mordants can be soluble or dispersible in water. Exemplary cationic mordants are polymeric ammonium compounds such as polyvinylbenzyldi- or trialkylammonium compounds, optionally quaternized poly(di)allylammonium compounds, polymethacryloxyethyldimethylhydroxyethylammonium chloride, polyvinylbenzylmethylimidazolium chloride, polyvinylbenzylpicolinium chloride or polyvinylbenzyltributylammonium chloride. Further examples are basic polymers such as poly(dimethylaminoethyl)methacrylate, polyalkylenepolyamines and their condensation products with dicyanodiamide, amine/epichlorohydrin polycondensates or the compounds disclosed in JP-A-57-36692, 57-64591, 57-187289, 57-191084, 58-177390, 58-208357, 59-20696, 59-33176, 59-96987, 59-198188, 60-49990, 60-71796, 60-72785, 60-161188, 60-187582, 60-189481, 60-189482, 61-14979, 61-43593, 61-57379, 61-57380, 61-58788, 61-61887, 61-63477, 61-72581, 61-95977, 61-134291 or in U.S. Pat. Nos. 4,547,405 and 4,554,181 as well as in DE-A-3417582 and EP-B-609 930. The mordants used can also be compounds containing phosphonium groups (EP-B-609 930) as well as ground cationic ion exchange resins which are introduced in the mordant layer in a finely divided form. Further suitable cationic mordants are described in U.S. Pat. No. 6,102,997, pages 12 to 17. The cationic mordants can be soluble or dispersible in water and have an average molecular weight (weight average) of preferably at least 2,000 and, in particular, at least 20,000.

Besides the dye acceptor layer(s), the ink jet recording material might comprise other layers on the ink receiving side, which are intended, for example, for providing scratch resistance, absorbing water or controlling whiteness and/or glossiness. The backside of the substrate might also be coated with at least one binder layer, in order to prevent buckling of the recording material.

The ink jet ink or ink jet recording material might also contain a number of other additives such as antioxidants, further light stabilizers (also including UV absorbers), viscosity improvers, fluorescent whitening agents, biocides, wetting agents, emulsifiers and spacers.

Suitable spacers are in particular spherical, have an average diameter of 1 to 50 μm, and in particular 5 to 20 μm, and have a narrow particle size distribution. Suitable spacers consist, for example, of polymethylmethacrylate, polystyrene, polyvinyl toluene, silicon dioxide and insoluble starch.

Illustrative examples of particularly suitable antioxidants are sterically hindered phenols, hydroquinones and hydroquinone ethers, for example the antioxidants disclosed in GB-A-2 088 777 or JP-A-60-72785, JP-A-0-72786 and JP-A-60-71796.

Illustrative examples of particularly suitable light stabilizers are organic nickel compounds and sterically hindered amines, for example the light stabilizers disclosed in JP-A-58-152072, 61-146591, 61-163886, 60-72785 and 61-146591 or in U.S. Pat. No. 5,073,448, EP685 345 and EP704 316, GB-A-2 088 777, JP-A-59-169883 and 61-177279.

Suitable UV (ultraviolet light) absorbers are disclosed, inter alia, in Research Disclosure No. 24239 (1984) page 284, 37254 part VIII (1995) page 292, 37038 part X (1995) page 85 and 38957 part VI (1996), GB-A-2 088 777, U.S. Pat. No. 4,926,190, EP306083 and U.S. Pat. No. 5,597,854. These compounds are preferably introduced into the layer(s) farthest from the support. In a particular embodiment, the UV absorbers are contained in a layer above the layer(s) containing the present sterically hindered N-hydroxylamine salts or the dialkyl N-hydroxylamine salts. Further examples of particularly suited UV absorbers are listed in U.S. Pat. No. 6,102,997 pages 18–19. The UV absorbers can be soluble or insoluble in water and added to the coating composition as dispersion or emulsion, optionally together with high-boiling solvents, using suitable dispersing agents or emulsifiers. Suitable high boiling solvents are described in Research Disclosure No. 37254 part VIII (1995) page 292.

Suitable UV absorbers for concurrent use with a present sterically hindered N-hydroxylamine salt or a dialkyl N-hydroxylamine salt in recording materials for ink jet printing are for example hydroxyphenylbenzotriazoles, the tris-aryl-s-triazines, the benzophenones, the α-cyanoacrylates, the oxanilides, the benzoxazinones, the benzoates and the α-alkyl cinnamates.

For example, the UV absorber is a hydroxyphenylbenzotriazole, a tris-aryl-s-triazine or a benzophenone.

Typical and useful UV absorbers are, for example, 5-chloro-2-(2-hydroxy-3,5-di-tert-butylphenyl)-2H-benzotriazole;

2-(2-hydroxy-3,5-di-tert-butylphenyl)-2H-benzotriazole;

2-(2-hydroxy-3,5-di-tert-amylphenyl)-2H-benzotriazole;

2-(2-hydroxy-3,5-di-α-cumylphenyl)-2H-benzotriazole;

2-(2-hydroxy-3-α-cumyl-5-tert-octylphenyl)-2H-benzotriazole;

2-(2-hydroxy-5-tert-octylphenyl)-2H-benzotriazole;

2-(2-hydroxy-5-methylphenyl)-2H-benzotriazole;

2-(2-hydroxy-3-tert-butyl-5-methylphenyl)-2H-benzotriazole-5-sulfonic acid, sodium salt;

3-tert-butyl-4-hydroxy-5-(2H-benzotriazol-2-yl)-hydrocinnamic acid;

12-hydroxy-3,6,9-trioxadodecyl 3-tert-butyl-4-hydroxy-5-(2H-benzotriazol-2-yl)-hydrocinnamate;

octyl 3-tert-butyl-4-hydroxy-5-(2H-benzotriazol-2-yl)-hydrocinnamate;

2-(3-t-butyl-2-hydroxy-5-(2-(ω-hydroxy-octa-(ethyleneoxy)carbonyl-ethyl)-phenyl)-2H-benzotriazole;

4,6-bis(2,4-dimethylphenyl)-2-(4-octyloxy-2-hydroxyphenyl)-s-triazine;

2,4-bis(2-hydroxy-4-butyloxyphenyl)-6-(2,4-bis-butyloxyphenyl)-1,3,5-triazine;

2-[4-(dodecyloxy/tridecyloxy-2-hydroxypropoxy)-2-hydroxyphenyl]-4,6-bis(2,4-dimethylphenyl)1,3,5-triazine;

the reaction product of tris(2,4-dihydroxyphenyl)-1,3,5-triazine with the mixture of α-chloropropionic esters (made from isomer mixture of $C_7$–$C_9$alcohols);

2,4-dihydroxybenzophenone;

2,2',4,4'-tetrahydroxy-5,5'-disulfobenzophenone, disodium salt;

2-hydroxy-4-octyloxybenzophenone;

2-hydroxy-4-dodecyloxybenzophenone;

2,4-dihydroxybenzophenone-5-sulfonic acid and salts thereof;

2-hydroxy-4-methoxybenzophenone-5-sulfonic acid and salts thereof;

2,2'-dihydroxy-4,4'dimethoxybenzophenone-5,5'-disodium sulfonate;

3-(2H-benzotriazol-2-yl)-4-hydroxy-5-sec-butylbenzenesulfonic acid, sodium salt; and 2-(2'-hydroxy-3'-tert-butyl-5'-polyglycolpropionate-phenyl)benzotriazole.

The ink jet ink or ink jet recording material may contain singlet oxygen quenchers, for example 1,4-diazabicyclo [2.2.2]octane (DABCO).

The binders in the individual layers, and in particular gelatines, can also be crosslinked by suitable compounds, so-called hardening agents, in order to improve the water and scratch resistance of the layers. Suitable hardening agents are described in Research Disclosure No. 37254 part IX (1995) page 294, 37038 part XII (1995) page 86 and 38957 part IIB (1996) page 599 et seq. The hardening agents are normally used in quantities of 0.005 to 10% by weight, and preferably 0.01 to 1% by weight, based on the binder to be hardened.

The ink jet recording material can be produced in one pass from the support material and a casting solution for each layer to be applied, by means of a cascade or curtain casting device of the kind known from the production of photographic silver halide materials. After the casting solution(s) has/have been cast on the support, the material is dried and is then ready for use. The individual layers have a dry layer thickness of 0.1 to 20 μm, and preferably 0.5 to 5 μm.

Present sterically hindered N-hydroxylamine salts and the dialkyl N-hydroxylamine salts can be dissolved either directly in the ink or coating composition or added thereto in the form of an emulsion or suspension. As already mentioned, the present sterically hindered N-hydroxylamine salts and the dialkyl N-hydroxylamine salts can be also applied to the recording material in a separate operation, alone or together with other already described components, as a solution in water or in a suitable organic solvent. Application can be made by spraying, by sizing in a sizing press, by a separate coating operation or by immersion in a vat. After subjecting the recording material to such an after treatment, an additional drying step is necessary.

The invention is illustrated by the following non-limitative examples.

EXAMPLE 1

An ink-jet ink is prepared by dissolving 2 g of dye in 20 g of diethylene glycol and 78 g of deionized water. The dye used is Acid red 52. The stabilizer is weighed in an amount of 0.15 g into a test tube and dissolved in 2.85 g of ink. The obtained ink is filtered and transferred into an emptied and carefully cleaned cartridge of a Deskjet 510 printer (Hewlett-Packard). A stepped image is then printed onto plain paper (sihl+eika). The produced print is left to dry at 50° C. under vacuum for two hours and thereafter irradiated behind a 5 mm thick window glass in an Atlas Ci-35 light fading device equipped with a Xenon lamp. The Atlas device is operated at 43° C., 50% RH without dark cycles and the light intensity is 461 W/m$^2$ (300–800 nm). The color density of each step is measured before and after exposure using a MacBeth TR 924 densitometer.

The results are summarized below, for an initial density of 1. Lower density loss values indicate higher light fastness.

| Stabilizer | Density loss (%) After 7.5 kJ/cm$^2$ |
|---|---|
| None | 42 |
| Compound A | 23 |
| Compound C | 22 |
| Compound B | 16 |

Compound A is 1-oxyl-2,2,6,6-tetramethyl-4-hydroxypiperidine.

Compound B is 1-hydroxy-2,2,6,6-tetramethyl-4-hydroxypiperidinium hydrochloride.

Compound C is 1-hydroxy-2,2,6,6-tetramethyl-4-hydroxypiperidinium citrate.

As the above data shows, compounds according to this invention are able to improve substantially the light fastness of the ink-jet print.

EXAMPLE 2

Magenta and Yellow inks are extracted from an Hewlett-Packard three-color cartridge (HP C1823D). The stabiliser is weighed in an amount of 0.15 g into a test tube and dissolved in 2.85 g of either the magenta or yellow ink. The obtained ink is filtered and transferred into an emptied and carefully cleaned cartridge of a Deskjet 510 printer (Hewlett-Packard). A stepped image is then printed onto plain paper (sihl+eika) or, alternatively, onto Premium Photo paper from Hewlett-Packard (item code C6040A). The produced print is left to dry at 50° C. under vacuum for two hours and thereafter irradiated behind a 5 mm thick window glass in an Atlas Ci-35 light fading device equipped with a Xenon lamp. The Atlas device is operated at 43° C., 50% RH without dark cycles and the light intensity is 461 W/m$^2$ (300–800 nm). The color density of each step is measured before and after exposure using a MacBeth TR 924 densitometer.

The results are summarized in the table below, for an initial density of 1. Lower density loss values indicate higher light fastness.

| | Density loss (%) after 30 kJ · cm$^{-2}$ | | |
|---|---|---|---|
| | Magenta print | | Yellow print |
| Stabilizer | on plain paper | on HP Premium paper | on plain paper |
| none | 41 | 19 | 24 |
| Compound A | 33 | 9 | 20 |
| Compound B | 31 | 5 | 20 |

Compound A is 1-oxyl-2,2,6,6-tetramethyl-4-hydroxypiperidine.
Compound B is 1-hydroxy-2,2,6,6-tetramethyl-4-hydroxypiperidinium hydrochloride.

As the above table shows, compounds according to this invention are able to improve clearly the light fastness of the magenta and yellow prints.

EXAMPLE 3

Canon PR-101 sheets (Canon Japan) are post-treated by casting stabilizer solutions, either aqueous or methanol, using a 75 micron wire wound coating bar. After drying at room temperature, the thus modified sheets are printed with cyan step images using a Canon BJC 8200 printer. The cyan dye used is C.I. Direct Blue 199. The obtained prints are left to dry at 50C under vacuum for two hours and thereafter are subjected to forced airflow during four weeks. The color density is measured before and after exposure using a MacBeth TR 924 densitometer.

| Stabilizer | % Density Loss after 28 days |
|---|---|
| None | 20 |
| Compound A (0.5 g/m$^2$) | 14 |
| Compound A (1.0 g/m$^2$) | 14 |
| Compound C (0.5 g/m$^2$) | 14 |
| Compound C (1.0 g/m$^2$) | 12 |
| Compound D (0.5 g/m$^2$) | 9 |
| Compound D (1.0 g/m$^2$) | 4 |

Compound A is 1-oxyl-2,2,6,6-tetramethyl-4-hydroxypiperidine.
Compound C is 1-hydroxy-2,2,6,6-tetramethyl-4-hydroxypiperidinium citrate.
Compound D is bis(1-hydroxy-2,2,6,6-tetramethylpiperidin-4-yl) sebacate dihydrochloride.

As the above data show, compounds according to this invention are able to improve clearly the light fastness of cyan prints.

EXAMPLE 4

Canon PR-101 sheets (Canon Japan) are post-treated by casting stabilizer solutions, either aqueous or methanol, using a 75 micron wire wound coating bar. After drying at room temperature, the thus modified sheets are printed with cyan step images using a Canon BJC 8200 printer. The cyan dye used is C.I. Direct Blue 199. The obtained prints are left to dry at 50C under vacuum for two hours. Samples are irradiated behind a 5 mm thick window glass in an Atlas Ci-35 light fading device equipped with a 3500 W Xenon lamp. The Atlas device is operated at 43° C. 50% RH without dark cycles. The CIEL*a*b coordinates of each step are measured before and after exposure using a Datacolor Elrepho 2000 densitometer. The change in color is given by Delta E (DE) which is calculated by:

$$DE=[(DL^*)^2+(Da^*)^2+(Db^*)^2]^{1/2}$$

| Stabilizer | DE after 15 kJ/cm2 |
|---|---|
| None | 6 |
| Compound A (0.5 g/m2) | 5 |
| Compound D (0.5 g/m2) | 4 |

Compound A is 1-oxyl-2,2,6,6-tetramethyl-4-hydroxypiperidine
Compound D is bis(1-hydroxy-2,2,6,6-tetramethylpiperidin-4-yl) sebacate dihydrochloride As the above data show, compounds according to this invention are able to improve clearly the light fastness of the cyan prints.

EXAMPLE 5

A resin-coated paper impregnated with inorganic adsorbent particles (Konica QP Photoglossy ink jet paper, Konica Corp.) is purchased. On the ink-receiving layer, a 0.8 wt % methanol solution of the instant compounds is applied in an amount to achieve 650–700 mg/m$^2$. The paper is allowed to dry under ambient temperature and pressure for 24 hours. Separately, test patterns (cyan, magenta and yellow) are printed on the treated sheets using a Hewlett Packard DeskJet 970 Cxi printer at 100% print density. The obtained prints are left to dry at ambient temperature and pressure for 24 hours. Color densities and CIEL*a*b coordinates before and after exposure are measured using X-Rite 938 Spectrodensitometer. Exposures are carried out using normal office fluorescent lighting.

| Stabilizer | DE for magenta after 13 weeks |
|---|---|
| None | 32.5 |
| Compound C | 14.2 |
| Compound A | 9.3 |
| Compound D | 4.5 |
| **Stabilizer** | **DE for cyan after 13 weeks** |
| None | 8.7 |
| Compound C | 6.9 |
| Compound D | 5.1 |
| **Stabilizer** | **DE for yellow after 13 weeks** |
| None | 5.2 |
| Compound A | 3.3 |
| Compound C | 3.2 |
| Compound D | 2.6 |

Compound A is 1-oxyl-2,2,6,6-tetramethyl-4-hydroxypiperidine
Compound C is 1-hydroxy-2,2,6,6-tetramethyl-4-hydroxypiperidinium citrate
Compound D is bis(1-hydroxy-2,2,6,6-tetramethylpiperidin-4-yl) sebacate dihydrochloride As the above data show, compounds according to this invention are able to improve clearly the color fastness of ink jet prints.

EXAMPLE 6

The instant compounds are added to an ink composition, for example as disclosed in U.S. Pat. Nos. 5,855,655 or 5,782,963, at a concentration of 2 wt % and 0.5 wt % respectively. The images printed from these stabilized inks show reduced dye fading and better image permanence.

EXAMPLE 7

A commercial white polyethylene terephthalate sheet is coated with silica and polyvinylalcohol according to U.S. Pat. No. 6,391,440 Example 1. A methanol solution of the instant compounds is applied to this sheet in an amount equivalent to 400 mg/m$^2$. The image printed on this receiving layer shows reduced dye fading and better image permanence.

EXAMPLE 8

A commercial white polyethylene terephthalate sheet is coated with alumina hydrate and polyvinylalcohol according to U.S. Pat. No. 6,391,440 Example 5. A methanol solution of the instant compounds is applied to this sheet in an amount equivalent to 400 mg/M$^2$. The image printed on this receiving layer shows reduced dye fading and better image permanence.

EXAMPLE 9

A paper sheet containing alumina is prepared according to U.S. Pat. No. 6,391,440 Example 8. A methanol solution of the instant compounds is applied to this sheet in an amount equivalent to 600 mg/m2. The image printed on this receiving layer shows reduced dye fading and better image permanence.

EXAMPLE 10

A paper sheet containing silica is prepared according to U.S. Pat. No. 5,165,973. A methanol solution of the instant compounds is applied to this sheet in an amount equivalent to 700 mg/m2. The image printed on this receiving layer shows reduced dye fading and better image permanence.

EXAMPLE 11

A resin-coated paper impregnated with inorganic adsorbent particles (Konica QP Photoglossy ink jet paper, Konica Corp.) is purchased. On the ink-receiving layer, a 0.8 wt % methanol solution of the instant compounds is applied in an amount to achieve 650–700 mg/m$^2$. The paper is allowed to dry under ambient temperature and pressure for 24 hours.

Separately, test patterns (cyan, magenta and yellow) are printed on the treated sheets using a Hewlett Packard DeskJet 970 Cxi printer at 100% print density. The obtained prints are left to dry at ambient temperature and pressure for 24 hours. Color densities and CIEL*a*b coordinates before and after exposure are measured using X-Rite 938 Spectrodensitometer. Exposures are carried out using normal office fluorescent lighting.

| Stabilizer | DE for magenta after 15 weeks |
|---|---|
| None | 5.49 |
| Compound E | 2.41 |
| Compound F | 2.23 |
| **Stabilizer** | **DE for cyan after 15 weeks** |
| None | 4.29 |
| Compound E | 3.73 |
| Compound F | 2.99 |

-continued

| Stabilizer | DE for yellow after 15 weeks |
|---|---|
| Compound E | 5.22 |
| None | 2.48 |
| Compound F | 1.12 |

Compound E is 1,4-diazabicyclo[2.2.2]octane
Compound F is a 1:1 by weight mixture of 1,4-diazabicyclo[2.2.2]octane and bis(1-hydroxy-2,2,6,6-tetramethylpiperidin-4-yl) sebacate dihydrochloride As the above data show, compounds according to this invention are able to improve clearly the color fastness of ink jet prints.

EXAMPLE 12

A resin-coated paper impregnated with inorganic adsorbent particles (Konica QP Photoglossy ink jet paper, Konica Corp.) is purchased. On the ink-receiving layer, a 0.8 wt % methanol solution of the instant compounds is applied in an amount to achieve 650–700 mg/$m^2$. The paper is allowed to dry under ambient temperature and pressure for 24 hours. Separately, test patterns (cyan, magenta and yellow) are printed on the treated sheets using a Hewlett Packard DeskJet 970 Cxi printer at 100% print density. The obtained prints are left to dry at ambient temperature and pressure for 24 hours. Color densities and CIEL*a*b coordinates before and after exposure are measured using X-Rite 938 Spectrodensitometer. Exposures are carried out using normal office fluorescent lighting.

| | | % OD loss cyan | |
|---|---|---|---|
| Stabilizer | DE for cyan after 3 months | 3 months | 2 months |
| None | 12.40 | 30 | 18 |
| Compound G | 11.92 | 23 | 11 |
| Compound H | 11.65 | 25 | 15 |
| Compound J | 11.42 | 26 | 15 |
| Compound K | 10.31 | 21 | 9 |

Compound G is N,N-dibenzylhydroxylamine hydrochloride
Compound H is N,N-di-(2-fluoro-6-chlorobenzyl)hydroxylamine hydrochloride
Compound J is N,N-diethylhydroxylamine hydrochloride
Compound K is N,N-di-(4-chlorobenzyl)hydroxylamine hydrochloride OD is optical density. As the above data show, compounds according to this invention are able to improve clearly the color fastness of ink jet prints.

EXAMPLE 13

A resin-coated paper impregnated with inorganic adsorbent particles (Konica QP Photoglossy ink jet paper, Konica Corp.) is purchased. On the ink-receiving layer, a 0.8 wt % methanol solution of the instant compounds is applied in an amount to achieve 650–700 mg/$m^2$. The paper is allowed to dry under ambient temperature and pressure for 24 hours.

Separately, test patterns (cyan, magenta and yellow) are printed on the treated sheets using a Hewlett Packard DeskJet 970 Cxi printer at 100% print density. The obtained prints are left to dry at ambient temperature and pressure for 24 hours. Color densities and CIEL*a*b coordinates before and after exposure are measured using X-Rite 938 Spectrodensitometer. Exposures are carried out using normal office fluorescent lighting.

| | | % OD loss magenta | |
|---|---|---|---|
| Stabilizer | DE for magenta after 3 months | 3 months | 2 months |
| None | 21.71 | 43 | 26 |
| Compound K | 18.32 | 30 | 15 |
| Compound H | 16.75 | 28 | 15 |
| Compound G | 16.66 | 27 | 14 |
| Compound J | 16.03 | 32 | 21 |
| Compound L | 14.47 | 21 | 10 |

Compound G is N,N-dibenzylhydroxylamine hydrochloride
Compound H is N,N-di-(2-fluoro-6-chlorobenzyl)hydroxylamine hydrochloride
Compound J is N,N-diethylhydroxylamine hydrochloride
Compound K is N,N-di-(4-chlorobenzyl)hydroxylamine hydrochloride
Compound L is 1-hydroxy-2,2,6,6-tetramethyl-4-hydroxypiperidinium hydrosulfate As the above data show, compounds according to this invention are able to improve clearly the color fastness of ink jet prints.

EXAMPLE 14

A resin-coated paper impregnated with inorganic adsorbent particles (Konica QP Photoglossy ink jet paper, Konica Corp.) is purchased. On the ink-receiving layer, a 0.8 wt % methanol solution of the instant compounds is applied in an amount to achieve 650–700 mg/$m^2$. The paper is allowed to dry under ambient temperature and pressure for 24 hours.

Separately, test patterns (cyan, magenta and yellow) are printed on the treated sheets using a Hewlett Packard DeskJet 970 Cxi printer at 100% print density. The obtained prints are left to dry at ambient temperature and pressure for 24 hours. Color densities and CIEL*a*b coordinates before and after exposure are measured using X-Rite 938 Spectrodensitometer. Exposures are carried out using normal office fluorescent lighting.

| Stabilizer | DE for yellow after 3 months |
|---|---|
| None | 6.85 |
| Compound G | 5.31 |
| Compound M | 1.79 |

Compound G is N,N-dibenzylhydroxylamine hydrochloride
Compound M is a 1:1 by weight mixture of N,N-di-(4-carbomethoxybenzyl)hydroxylamine hydrochloride and N,N-dibenzylhydroxylamine hydrochloride As the above data show, compounds according to this invention are able to improve clearly the color fastness of ink jet prints.

EXAMPLE 15

A resin-coated paper impregnated with inorganic adsorbent particles (Konica QP Photoglossy ink jet paper, Konica Corp.) is purchased. On the ink-receiving layer, a 0.8 wt % methanol solution of an equimolar mixture of the instant compounds and 3-(2H-benzotriazol-2-yl)-4-hydroxy-5-sec-butylbenzene sulfonic acid, sodium salt, a benzotriazole based UV absorber, is applied in an amount to achieve 650–700 mg/$m^2$. The paper is allowed to dry under ambient temperature and pressure for 24 hours. Separately, test patterns (cyan, magenta and yellow) are printed on the treated sheets using a Hewlett Packard DeskJet 990 Cxi printer at 50% and 100% print density. The obtained prints are left to dry at ambient temperature and pressure for 24 hours. Color densities and CIEL*a*b coordinates before and after exposure are measured using X-Rite 938 Spectrodensitometer. Exposures are carried out using normal office fluorescent lighting. The combined compounds according to this invention are able to improve clearly the color fastness of ink jet prints better than either compound alone.

| Stabilizer | 100% print density | 50% print density |
|---|---|---|
| | % OD loss for magenta after 4 weeks | |
| None | 70 | 62 |
| Compound D | 55 | 51 |
| Compound BZT | 70 | 63 |
| Compound D + BZT | 29 | 25 |
| | % OD loss for cyan after 4 weeks | |
| None | 36 | 40 |
| Compound D | 25 | 30 |
| Compound BZT | 25 | 42 |
| Compound D + BZT | 15 | 17 |
| | % OD loss for yellow after 4 weeks | |
| None | 14 | 21 |
| Compound D | 12 | 13 |
| Compound BZT | 11 | 13 |
| Compound D + BZT | 8 | 3 |

Compound D is bis(1-hydroxy-2,2,6,6-tetramethylpiperidin-4-yl) sebacate dihydrochloride
Compound BZT is 3-(2H-benzotriazol-2-yl)-4-hydroxy-5-sec-butylbenzene sulfonic acid, sodium salt

EXAMPLE 16

A resin-coated paper impregnated with inorganic adsorbent particles (Konica QP Photoglossy ink jet paper, Konica Corp.) is purchased. On the ink-receiving layer, a 0.8 wt % methanol solution of the instant compounds and 3-(2H-benzotriazol-2-yl)-4-hydroxy-5-sec-butylbenzene sulfonic acid, sodium salt, a benzotriazole based UV absorber, is applied in an amount to achieve 650–700 mg/m$^2$. The UV absorber and the instant compounds are in a 2:1 ratio by weight. The paper is allowed to dry under ambient temperature and pressure for 24 hours. Separately, test patterns (cyan, magenta and yellow) are printed on the treated sheets using an Epson printer at 100% print density. The obtained prints are left to dry at ambient temperature and pressure for 24 hours. Color densities and CIEL*a*b coordinates before and after exposure are measured using X-Rite 938 Spectrodensitometer. Exposures are carried out using normal office fluorescent lighting. The compounds according to this invention are able to improve clearly the color fastness of ink jet prints.

The UV absorber and the instant compounds may likewise be employed at 1:5, 1:4, 1:3, 1:2, 1:1, 3:1, 4:1 and 5:1 weight:weight ratios with good results.

EXAMPLE 17

A resin-coated paper impregnated with inorganic adsorbent particles (Konica QP Photoglossy ink jet paper, Konica Corp.) is purchased. On the ink-receiving layer, a 0.8 wt % methanol solution of the instant compounds and 2-(3-t-butyl-2-hydroxy-5-(2-(ω-hydroxy-octa-(ethyleneoxy)carbonyl-ethyl)-phenyl)-2H-benzotriazole, a benzotriazole based UV absorber, is applied in an amount to achieve 650–700 mg/m$^2$. The UV absorber and the instant compounds are in a 1:1 ratio by weight. The paper is allowed to dry under ambient temperature and pressure for 24 hours. Separately, test patterns (cyan, magenta and yellow) are printed on the treated sheets using a Hewlett Packard DeskJet 970 Cxi printer at 50% print density. The obtained prints are left to dry at ambient temperature and pressure for 24 hours. Color densities and CIEL*a*b coordinates before and after exposure are measured using X-Rite 938 Spectrodensitometer. Exposures are carried out using uv lamps. The compounds according to this invention are able to improve clearly the color fastness of ink jet prints.

The UV absorber and the instant compounds may likewise be employed at 5:1, 4:1, 3:1, 2:1, 1:2, 1:3, 1:4 and 1:5 weight:weight ratios with good results.

EXAMPLE 18

A resin-coated paper impregnated with inorganic adsorbent particles (Konica QP Photoglossy ink jet paper, Konica Corp.) is purchased. On the ink-receiving layer, a 0.8 wt % methanol solution of the instant compounds is applied in an amount to achieve 650–700 mg/m$^2$. The paper is allowed to dry under ambient temperature and pressure for 24 hours. Separately, test patterns (cyan, magenta and yellow) are printed on the treated sheets using a Hewlett Packard DeskJet 990 Cxi printer at 50% and 100% print density. The obtained prints are left to dry at ambient temperature and pressure for 24 hours. Color densities and CIEL*a*b coordinates before and after exposure are measured using X-Rite 938 Spectrodensitometer. Exposures are carried out using normal office fluorescent lighting. The compounds according to this invention are able to improve clearly the color fastness of ink jet prints.

| Stabilizer | 100% print density | 50% print density |
|---|---|---|
| | % OD loss for magenta after 4 weeks | |
| None | 70 | 62 |
| Compound DH | 48 | 47 |
| Compound CY | 36 | 44 |
| Compound PH | 37 | 50 |
| | % OD loss for cyan after 4 weeks | |
| None | 36 | 40 |
| Compound DH | 14 | 18 |
| Compound CY | 16 | 24 |
| Compound PH | 14 | 27 |
| | % OD loss for yellow after 4 weeks | |
| None | 14 | 21 |
| Compound DH | 8 | 13 |
| Compound CY | 10 | 9 |
| Compound PH | 13 | 17 |

Compound DH is the HCL salt of

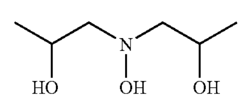

Compound CY is the HCL salt of

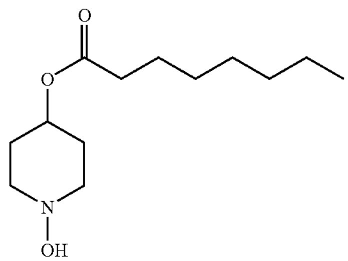

Compound PH is the HCL salt of

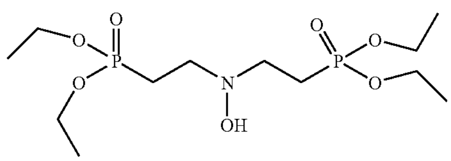

What is claimed is:

1. An ink jet ink comprising at least one dialkyl N-hydroxylamine salt of the formula $(R_{51}R_{52}N—OH).(HY)$, or an ink jet system comprising a recording material and at least one colored ink to be applied to the recording material by means of an ink jet nozzle, wherein the recording material or the at least one colored ink comprises at least one dialkyl N-hydroxylamine salt of the formula $(R_{51}R_{52}N—OH).(HY)$, where $R_{51}$ is alkyl of 1 to 36 carbon atoms, cycloalkyl of 5 to 12 carbon atoms or aralkyl of 7 to 9 carbon atoms; or $R_{51}$ is said alkyl, cycloalkyl or aralkyl substituted by one to six alkyl of 1 to 12 carbon atoms, halogen, cyano, $E_{41}O$—, $E_{41}CO$—, $E_{41}OCO$—, $E_{41}COO$—, $E_{41}S$—, $E_{41}SO$—, $E_{41}SO_2$—, $NH_2$, $NHE_{41}$, —$NE_{41}E_{42}$, —PO$(OE_{41})(OE_{42})$ or —OPO$(OE_{41})(OE_{42})$ groups;

$R_{52}$ is hydrogen or independently has the same meaning as $R_{51}$, where at least one of $R_{51}$ and $R_{52}$ contains a hydrogen alpha to the —NOH moiety;

$E_{41}$ and $E_{42}$ independently are hydrogen, alkyl of 1 to 4 carbon atoms or alkyl of 1 to 4 carbon atoms substituted by one to three hydroxyl groups; or $E_{41}$ and $E_{42}$ independently are an oligomer of poly(ethylene glycol) or poly(propylene glycol) terminated by hydroxy, methoxy, acetate or propionate, where the oligomer has a molecular weight up to about 500; and HY is an inorganic or organic acid.

2. An ink jet ink or ink jet system according to claim 1 where Y is phosphate, phosphonate, carbonate, bicarbonate, nitrate, chloride, bromide, bisulfite, sulfite, bisulfate, sulfate, borate, formate, acetate, benzoate, citrate, oxalate, tartrate, acrylate, polyacrylate, fumarate, maleate, itaconate, glycolate, gluconate, malate, mandelate, tiglate, ascorbate, polymethacrylate, a carboxylate of nitrilotriacetic acid, hydroxyethylethylenediaminetriacetic acid, ethylenediaminetetraacetic acid or of diethylenetriaminepentaacetic acid, a diethylenediamine-tetraacetic acid or of diethylenetriaminepentaacetic acid, an alkylsulfonate or an arylsulfonate.

3. An ink jet ink or ink jet system according to claim 1 where Y is chloride, bisulfate, sulfate, phosphate, nitrate, ascorbate, formate, acetate, benzoate, oxalate, citrate, a carboxylate of ethylenediaminetetraacetic acid or of diethylenetriaminepentaacetic acid or polyacrylate.

4. An ink jet ink or ink jet system according to claim 1 where the dialkyl N-hydroxylamine salts are salts of N,N-dibenzylhydroxylamine, N,N-dimethyl-hydroxylamine, N,N-diethylhydroxylamine, N,N-bis(2-hydroxypropyl)hydroxylamine, N,N-bis(3-hydroxypropyl)hydroxylamine, N,N-bis(2-carboxyethyl)hydroxylamine, N,N-bis(benzylthiomethyl)-hydroxylamine, N,N-dioctylhydroxylamine, N,N-dilaurylhydroxylamine, N,N-didodecylhydroxylamine, N,N-ditetradecylhydroxylamine, N,N-dihexadecylhydroxylamine, N,N-dioctadecylhydroxylamine, N-hexadecyl-N-tetradecylhydroxylamine, N-hexadecyl-N-heptadecylhydroxylamine, N-hexadecyl-N-octadecylhydroxylamine, N-heptadecyl-N-octadecylhydroxylamine, N-methyl-N-octadecylhydroxylamine or N,N-di(hydrogenated tallow)hydroxylamine,

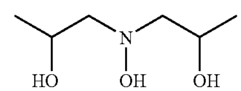

or

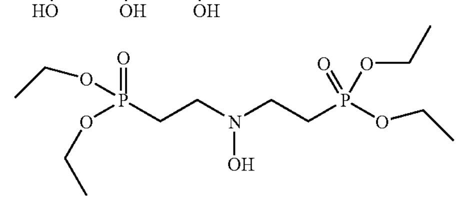

5. An ink jet ink or ink jet system according to claim 1 where the dialkyl N-hydroxylamine salts are salts of N,N-diethylhydroxylamine, N,N-bis(2-hydroxy-propyl)hydroxylamine, N,N-bis(3-hydroxypropyl)hydroxylamine, N,N-dibenzylhydroxylamine or the N,N-di(alkyl)hydroxylamine produced by the direct oxidation of N,N-di(hydrogenated tallow)amine.

6. An ink jet ink or ink jet system according to claim 1 where the dialkyl N-hydroxylamine salt is tris(N,N-diethylhydroxylammonium) citrate.

7. An ink jet ink according to claim 1 which comprises about 0.01 to about 30% by weight of at least one dialkyl N-hydroxylamine salt, based on the weight of the ink jet ink.

8. An ink jet system according to claim 1, wherein the recording material comprises about 1 to about 10000 $mg/m^2$ of at least one dialkyl N-hydroxylamine salt.

9. An ink jet ink or ink jet system according to claim 1 further comprising a UV absorber selected from the group consisting of the hydroxyphenylbenzotriazoles, the tris-aryl-s-triazines, the benzophenones, the α-cyanoacrylates, the oxanilides, the benzoxazinones, the benzoates and the α-alkyl cinnamates.

10. An ink jet ink or ink jet system according to claim 1 further comprising a UV absorber selected from the group consisting of the hydroxyphenylbenzotriazoles, the tris-aryl-s-triazines and the benzophenones.

11. An ink jet ink or ink jet system according to claim 1 further comprising a UV absorber selected from the group consisting of 5-chloro-2-(2-hydroxy-3,5-di-tert-butylphenyl)-2H-benzotriazole;

2-(2-hydroxy-3,5-di-tert-butylphenyl)-2H-benzotriazole;

2-(2-hydroxy-3,5-di-tert-amylphenyl)-2H-benzotriazole;

2-(2-hydroxy-3,5-di-α-cumylphenyl)-2H-benzotriazole;

2-(2-hydroxy-3-α-cumyl-5-tert-octylphenyl)-2H-benzotriazole;

2-(2-hydroxy-5-tert-octylphenyl)-2H-benzotriazole;

2-(2-hydroxy-5-methylphenyl)-2H-benzotriazole;

2-(2-hydroxy-3-tert-butyl-5-methylphenyl)-2H-benzotriazole-5-sulfonic acid, sodium salt;

3-tert-butyl-4-hydroxy-5-(2H-benzotriazol-2-yl)-hydrocinnamic acid;

12-hydroxy-3,6,9-trioxadodecyl 3-tert-butyl-4-hydroxy-5-(2H-benzotriazol-2-yl)-hydro-cinnamate;

octyl 3-tert-butyl-4-hydroxy-5-(2H-benzotriazol-2-yl)-hydrocinnamate;

2-(3-t-butyl-2-hydroxy-5-(2-(ω-hydroxy-octa-(ethyleneoxy)carbonyl-ethyl)-phenyl)-2H-benzotriazole;

4,6-bis(2,4-dimethylphenyl)-2-(4-octyloxy-2-hydroxyphenyl)-s-triazine;

2,4-bis(2-hydroxy-4-butyloxyphenyl)-6-(2,4-bis-butyloxyphenyl)-1,3,5-triazine;

2-[4-(dodecyloxy/tridecyloxy-2-hydroxypropoxy)-2-hydroxyphenyl]-4,6-bis(2,4-dimethylphenyl)1,3,5-triazine;

the reaction product of tris(2,4-dihydroxyphenyl)-1,3,5-triazine with the mixture of α-chloropropionic esters (made from isomer mixture of $C_7$–$C_9$alcohols);

2,4-dihydroxybenzophenone;

2,2',4,4'-tetrahydroxy-5,5'-disulfobenzophenone, disodium salt;

2-hydroxy-4-octyloxybenzophenone;

2-hydroxy-4-dodecyloxybenzophenone;

2,4-dihydroxybenzophenone-5-sulfonic acid and salts thereof;

2-hydroxy-4-methoxybenzophenone-5-sulfonic acid and salts thereof;

2,2'-dihydroxy-4,4'dimethoxybenzophenone-5,5'-disodium sulfonate;

3-(2H-benzotriazol-2-yl)-4-hydroxy-5-sec-butylbenzenesulfonic acid, sodium salt; and 2-(2'-hydroxy-3'-tert-butyl-5'-polyglycolpropionate-phenyl)benzotriazole.

12. A process for stabilizing ink jet prints, which process comprises applying to a recording material for ink jet printing an ink composition comprising an aqueous or an organic solvent dye solution and at least one dialkyl N-hydroxylamine salt according to claim 1 and drying said recording material.

13. A process for stabilizing ink jet prints, which process comprises applying to a recording material for ink jet printing a casting or coating dispersion or an aqueous or organic solution comprising at least one dialkyl N-hydroxylamine salt according to claim 1 and further applying either an ink composition comprising an aqueous or an organic solvent dye solution, or an ink composition comprising an aqueous or an organic solvent dye solution and at least one dialkyl N-hydroxylamine salt according to claim 1 and drying said recording material.

14. An ink jet recording material which is coated with at least one layer which is able to absorb ink, which at least one layer comprises at least one dialkyl N-hydroxylamine salt of the formula ($R_{51}$ $R_{52}$N—OH) .(HY), where $R_{51}$ is alkyl of 1 to 36 carbon atoms, cycloalkyl of 5 to 12 carbon atoms or aralkyl of 7 to 9 carbon atoms; or $R_{51}$ is said alkyl, cycloalkyl or aralkyl substituted by one to six alkyl of 1 to 12 carbon atoms, halogen, cyano, $E_{41}$O—, $E_{41}$CO—, $E_{41}$OCO—, $E_{41}$COO—, $E_{41}$S—, $E_{41}$SO—, E41$SO_2$—, —$NH_2$, —NH$E_{41}$, —N$E_{41}E_{42}$, —PO(O$E_{41}$)(O$E_{42}$) or —OPO(O$E_{41}$)(OE42) groups;

$R_{52}$ is hydrogen or independently has the same meaning as $R_{51}$, where at least one of $R_{51}$ and $R_{52}$ contains a hydrogen alpha to the —NOH moiety;

$E_{41}$ and $E_{42}$ independently are hydrogen, alkyl of 1 to 4 carbon atoms or alkyl of 1 to 4 carbon atoms substituted by one to three hydroxyl groups; or $E_{41}$ and $E_{42}$ independently are an oligomer of poly(ethylene glycol) or poly(propylene glycol) terminated by hydroxyl, methoxy, acetate or propionate, where the oligomer has a molecular weight up to about 500; and HY is an inorganic or organic acid.

15. An ink jet recording material according to claim 14 where Y is phosphate, phosphonate, carbonate, bicarbonate, nitrate, chloride, bromide, bisulfite, sulfite, bisulfate, sulfate, borate, formate, acetate, benzoate, citrate, oxalate, tartrate, acrylate, polyacrylate, fumarate, maleate, itaconate, glycolate, gluconate, malate, mandelate, tiglate, ascorbate, polymethacrylate, a carboxylate of nitrilo-triacetic acid, hydroxyethylethylenediaminetriacetic acid, ethylenediaminetetraacetic acid or of diethylenetriaminepentaacetic acid, a diethylenediaminetetraacetic acid or of diethylenetriaminepenta-acetic acid, an alkylsulfonate or an arylsulfonate.

16. An ink jet recording material according to claim 14 where Y is chloride, bisulfate, sulfate, phosphate, nitrate, ascorbate, formate, acetate, benzoate, oxalate, citrate, a carboxylate of ethylenediaminetetraacetic acid or of diethylenetriaminepentaacetic acid or polyacrylate.

17. An ink jet recording material according to claim 14 where the dialkyl N-hydroxylamine salts are salts of N,N-dibenzylhydroxylamine, N,N-dimethylhydroxylamine, N,N-diethylhydroxylamine, N,N-bis(2-hydroxypropyl)hydroxylamine, N,N-bis(3-hydroxypropyl)hydroxylamine, N,N-bis(2-carboxyethyl)-hydroxylamine, N,N-bis(benzylthiomethyl)hydroxylamine, N,N-dioctylhydroxylamine, N,N-dilaurylhydroxylamine, N,N-didodecylhydroxylamine, N,N-ditetradecylhydroxylamine, N,N-dihexadecylhydroxylamine, N,N-dioctadecylhydroxylamine, N-hexadecyl-N-tetradecylhydroxylamine, N-hexadecyl-N-heptadecylhydroxylamine, N-hexadecyl-N-octadecylhydroxylamine, N-heptadecyl-N-octadecylhydroxylamine, N-methyl-N-octadecylhydroxylamine or N,N-di(hydrogenated tallow)hydroxylamine,

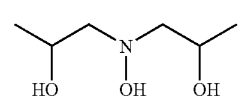

or

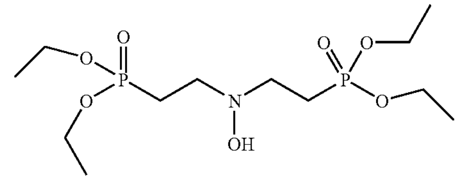

18. An ink jet recording material according to claim 14 where the dialkyl N-hydroxylamine salts are salts of N,N-diethylhydroxylamine, N,N-bis(2-hydroxypropyl)hydroxylamine, N,N-bis(3-hydroxy-propyl)hydroxylamine, N,N-dibenzylhydroxylamine or the N,N-di(alkyl)hydroxylamine produced by the direct oxidation of N,N-di(hydrogenated tallow)amine.

19. An ink jet recording material according to claim 14 where the dialkyl N-hydroxylamine salt is tris(N,N-diethylhydroxylammonium) citrate.

20. An ink jet recording material according to claim 14 which comprises about 1 to about 10000 mg/$m^2$ of at least one dialkyl N-hydroxylamine salt.

21. An ink jet recording material according to claim 14 further comprising a UV absorber selected from the group consisting of the hydroxyphenylbenzotriazoles, the tris-aryl-s-triazines, the benzophenones, the α-cyanoacrylates, the oxanilides, the benzoxazinones, the benzoates and the α-alkyl cinnamates.

22. An ink jet recording material according to claim 14 further comprising a UV absorber selected from the group consisting of the hydroxyphenylbenzotriazoles, the tris-aryl-s-triazines and the benzophenones.

23. An ink jet recording material according to claim 14 further comprising a UV absorber selected from the group consisting of 5-chloro-2-(2-hydroxy-3,5-di-tert-butylphenyl)-2H-benzotriazole;

2-(2-hydroxy-3,5-di-tert-butylphenyl)-2H-benzotriazole;

2-(2-hydroxy-3,5-di-tert-amylphenyl)-2H-benzotriazole;

2-(2-hydroxy-3,5-di-α-cumylphenyl)-2H-benzotriazole;

2-(2-hydroxy-3-α-cumyl-5-tert-octylphenyl)-2H-benzotriazole;

2-(2-hydroxy-5-tert-octylphenyl)-2H-benzotriazole;

2-(2-hydroxy-5-methylphenyl)-2H-benzotriazole;

2-(2-hydroxy-3-tert-butyl-5-methylphenyl)-2H-benzotriazole-5-sulfonic acid, sodium salt;

3-tert-butyl-4-hydroxy-5-(2H-benzotriazol-2-yl)-hydrocinnamic acid;

12-hydroxy-3,6,9-trioxadodecyl 3-tert-butyl-4-hydroxy-5-(2H-benzotriazol-2-yl)-hydro-cinnamate;

octyl 3-tert-butyl-4-hydroxy-5-(2H-benzotriazol-2-yl)-hydrocinnamate;

2-(3-t-butyl-2-hydroxy-5-(2-(ω-hydroxy-octa-(ethyleneoxy)carbonyl-ethyl)-phenyl)-2H-benzotriazole;

4,6-bis(2,4-dimethylphenyl)-2-(4-octyloxy-2-hydroxyphenyl)-s-triazine;

2,4-bis(2-hydroxy-4-butyloxyphenyl)-6-(2,4-bis-butyloxyphenyl)-1,3,5-triazine;

2-[4-(dodecyloxy/tridecyloxy-2-hydroxypropoxy)-2-hydroxyphenyl]-4,6-bis(2,4-dimethylphenyl)1,3,5-triazine;

the reaction product of tris(2,4-dihydroxyphenyl)-1,3,5-triazine with the mixture of α-chloropropionic esters (made from isomer mixture of $C_7$–$C_9$alcohols);

2,4-dihydroxybenzophenone;

2,2',4,4'-tetrahydroxy-5,5'-disulfobenzophenone, disodium salt;

2-hydroxy-4-octyloxybenzophenone;

2-hydroxy-4-dodecyloxybenzophenone;

2,4-dihydroxybenzophenone-5-sulfonic acid and salts thereof;

2-hydroxy-4-methoxybenzophenone-5-sulfonic acid and salts thereof;

2,2'-dihydroxy-4,4'-dimethoxybenzophenone-5,5'-disodium sulfonate;

3-(2H-benzotriazol-2-yl)-4-hydroxy-5-sec-butylbenzenesulfonic acid, sodium salt; and 2-(2'-hydroxy-3'-tert-butyl-5'-polyglycolpropionate-phenyl)benzotriazole.

* * * * *